I
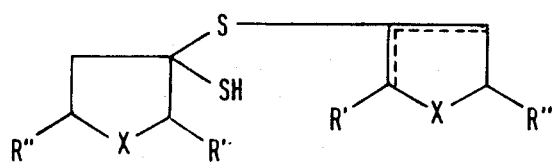
II
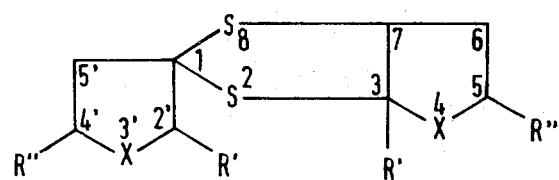
III
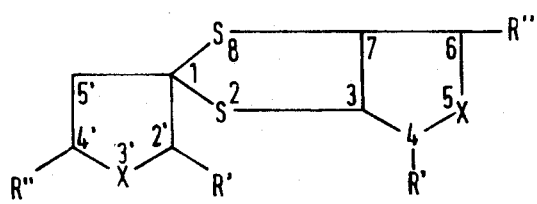

United States Patent Office 3,803,172
Patented Apr. 9, 1974

3,803,172
SULFUR CONTAINING FLAVORING AGENTS
AND THEIR PREPARATION
Bertus van der Wal, Hoevelaken, Netherlands, assignor to Polak's Frutal Works N.V., Amersfoort, Netherlands
Filed Jan. 4, 1972, Ser. No. 215,389
Claims priority, application Netherlands, Jan. 8, 1971, 7100235
Int. Cl. C07d 63/08, 71/00
U.S. Cl. 260—327 M   6 Claims

ABSTRACT OF THE DISCLOSURE

Compounds having Formula I, wherein X is selected from sulfur and oxygen, R' is methyl, and R" is selected from hydrogen and methyl, and the double bond is in either of the two positions represented by the dotted lines; and compounds having Formulae II and III, wherein X is selected from sulfur and oxygen, R' is methyl, and R" is selected from hydrogen and methyl. These compounds are useful as flavoring agents.

---

This invention relates to new sulfur containing flavoring agents (olfactory and gustatory agents) and to processes for producing them and more particularly it relates to novel flavoring compositions and to processes for producing them.

The invention also relates to a process for the flavoring of foodstuffs, which comprises the addition to a foodstuff of sulfur compounds either having Formula I, in which X is a sulfur atom or an oxygen atom, R' is a methyl and R" is either a hydrogen atom or a methyl group and the double bond is in either of the two positions represented by the dotted lines; or having the Formulae II and III, in which X is a sulfur atom or an oxygen atom, R' is a methyl and R" is either a hydrogen or a methyl group.

We have found that the compounds represented by Formula I, can be prepared by reacting solutions of the corresponding tetrahydrofuran-3-ones or tetrahydrothiophen-3-ones with hydrogen sulfide in the presence of a suitable base, such as, for instance, morpholine, pyrrolidine or ammonia at temperatures in the range of $+10°$ to $30°$ C. A great variety of basic reagents and solvents can in fact be used to effect the desired reaction.

The two compounds of Formula I, in which the double bond is in either the 2- or the 3-position are formed in a 80/20 ratio, respectively, when the reaction is carried out with ammonia as a base and isopropanol as a solvent. Other solvents, such as, for instance, dioxan, tetrahydrofuran and aprotic polar solvents such as dimethylformamide, dimethylacetamide, dimethylsulfoxide, hexamethylphosphortriamide are also suitable in the reaction.

The reaction of alkyl-substituted tetrahydrofuran-3-ones and tetrahydrothiophen-3-ones in acidic instead of alkaline media has been described in two Dutch patent applications (No. 69.10103 and No. 70.01674). In acidic media, however, the reaction takes a different course, and different products are formed.

Compounds represented by Formulae II and III are prepared by reacting compounds of the General Formula I with a trace of acid, such as hydrochloric acid, p-toluenesulfonic acid, etc. Compounds of Formula I with the double bond in the 2-position yield compounds having Formula II and those with the double bond in the 3-position yield compounds having Formula III. The reaction is preferably carried out in a solvent. A variety of solvents can be used: from hydrocarbons, alcohols, ethers as tetrahydrofuran, to aprotic polar solvents as dimethylformamide, dimethylacetaimed, dimethylsulfoxide, hexamethylphosphorustriamide. The cyclization to the spiro-compounds II and III can be effected at room temperature or at slightly elevated temperatures up to $100°$ C. Cyclization of products with the Formula I to those with Formulae II and III has, occasionally, also been observed upon standing at room temperature, without any acidic reagent or solvent being present.

It has been found that the compounds of the present invention have a characteristic aroma, which at certain concentrations may be called meat-like. They can therefore be used as components of a flavor aroma-composition that is meant to enhance the meat flavor of meat products or to impart a meat flavor to non-meat foods. For this purpose the compounds are active in a concentration as low as 0.1 part per million (p.p.m.) in the finished food; for meat type flavor the limits of the dosage can vary from 0.01 p.p.m. to 10 p.p.m. (in the finished food). In practice, the amount used can be varied over a much wider range according to the type of product desired, preferences of the user, and conditions under which the material is added or used. It will be understood that the term flavor composition as used herein means a material which has a flavor like cooked, fried, or roasted meat such as beef, pork, chicken, or ham, so that it can be used in the preparation of gravies, soups, soya protein products, salad dressing, cream sauce, dip sauces and other meat and non-meat foods.

Although the compounds of the present invention have flavors that can be described as meat-like, it should be explicitly stated that their application is a very wide one and not restricted to flavor compositions that are to impart meat aromas to foods. It has been found that the compounds of the present invention are also valuable components in flavor compositions of other types that can be characterized as or associated with flavor types of foodstuffs of animal origin and even certain vegetable types like e.g. maple or nuts.

The following examples are illustrative of the invention only, and are not intended to limit the same in any way.

EXAMPLE 1

Preparation of (2 - methyl-3-mercapto-tetrahydrofuryl-3) (2' - methyl-4',4'-dihydrofuryl-3')-sulfide, and (2-methyl - 3 - mercapto-tetrahydrofuryl-3)(2'-methyl-2',5'-dihydrofuryl-3')-sulfide; (I, R'=CH$_3$, R"=H, X=O)

In a three-necked 1 l. flask fitted with a mechanical stirrer, a thermometer and hydrogen sulfide inlet tube is placed 400 ml. of isopropanol. The stirrer is started and approximately 2 g. of gaseous ammonia is introduced. Then 100 g. of 2 - methyltetrahydrofuran-3-one (M.A. Gianturco et al., Tetrahedron 20, 1763–1772 (1964); B.P. $138°$ C./760 mm.) is added. Hydrogen sulfide is then introduced over a period of 14 hours at such a rate as to provide complete absorption. The reaction is slightly exothermic. The reaction temperature is kept between 15 and $30°$ C. After standing overnight at room temperature the isopropanol is removed in vacuo, first at 12 mm. and finally at 1 mm. while keeping the bottom temperature at $50°$ C. or less. The residue is filtered with suction over sodium sulfate in order to remove a small amount of insoluble material. The yield of crude product is 103 g., $n_D^{20}=1.555$. According to NMR spectra the product consists of at least 95% of a mixture of the title compounds.

Isolation of the (high boiling) isomers in a state of high parity is hampered by their relative instability at high temperatures.

In this example other solvents such as dioxan, tetrahydrofuran, dimethylformamide, and dimethylsulfoxide can be substituted for isopropanol in the same amount with similar results.

The following spectral data were obtained:
(1) NMR spectrum:

$\delta=4.32$ triplet—protons neighboring O-atom in 4,5-dihydrofurans $\delta=3.8$ multiplet—protons neighboring O-atom in tetrahydrofuran ring $\delta=1.9$ singlet—methyl group attached to double bond $\delta=1.25$ doublet—methyl group attached to secondary carbon atom The methyl group at $\delta=1.25$ integrates for more than 3 protons. The excess is accounted for by the presence of approx. 18% of the other double bond isomer of I.

(2) IR spectrum:

Absorption bands at: 2530, 1634, 1440, 1377, 1215, 1086, 1020, 980, 956, 857 cm.$^{-1}$.

The odor and taste of the products obtained can—in high dilution—be described as meat-like.

EXAMPLE 2

Preparation of 2′,3-dimethyl-3′,4-dioxa-2,8-dithia-bicyclo{3,3,0}octan-spirocyclopentane and 2′,4-dimethyl-3′,5-dioxa-2,8-dithia-bicyclo{3,3,0} octan-spirocyclopentane; (II/III, R′=CH$_3$, R″=H, X=O)

In a 250 ml. flask provided with a reflux condenser are placed 60 ml. of tetrahydrofuran (or 60 ml. dioxan, or 60 ml. dimethylsulfoxide), 43.0 g. of the material prepared according to Example I, and a trace of p-toluenesulfonic acid. The mixture is refluxed for 1 hour, after which the solvent is removed in vacuo. The residue is taken up in ether and washed to neutral with aqueous sodium hydrogen carbonate solution. After drying over sodium sulfate the solvent is removed to give 39 g. of—according to a gas chromatogram—a nearly pure mixture of the title compounds in a 85/15 ratio; $n_D^{20}=1.553$.

The following NMR spectral data were obtained for the mixture:

$\delta=1.76$ singlet—methyl group attached to tertiary carbon atom $\delta=1.23$ doublet—methyl group attached to secondary carbon atom The methyl group at $\delta=1.23$ integrates for more than 3 protons; the quaternary methyl group for less than 3 protons to the same extent. This accounts for the presence of approx. 15% of the 3′,5-dioxaspiro compound.

A pure specimen of the title compound with Formula II was obtained by distillation (B.P. 115° C./1 mm.), followed by preparative gas chromatography. The product was characterized by the following spectral data:

(1) NMR spectrum:

$\delta=1.76$ singlet—methyl group attached to tertiary carbon atom $\delta=1.23$ doublet—methyl group attached to secondary carbon atom The methyl groups at $\delta=1.76$ and $\delta=1.23$ both integrate for 3 protons.

(2) Mass spectrum: Masses (m/e); 232, 116, 84, 83, 43.

(3) IR spectrum: Absorption bands at: 1442, 1375, 1348, 1076, 1020, 872, 856 cm.$^{-1}$. The odor and taste of the products obtained can—in high dilution—be characterized as meat-like and liver-like.

The cyclization as described in the present example can take place also under less well-defined conditions. In same cases the cyclization reaction was found to occur upon standing at room temperature for a longer period of time (varying from a few days to half a year) and without addition of an acidic reagent or a solvent.

EXAMPLE 3

Preparation of (2,5-dimethyl-3-mercapto-tetrahydrofuryl-3)(2′,5′-dimethyl-4′,5′-dihydrofuryl-3′)sulfide and (2,5-dimethyl-3-mercapto-tetrahydrofuryl-3)(2′,5′-dimethyl - 2′,5′ - dihydrofuryl-3′)sulfide; (I, R′=R″=CH$_3$, X=O)

By the general procedure disclosed in Example 1, 171 g. of 2,5-dimethyl tetrahydrofuran-3-one (B.P. 143° C./760 mm., $n_D^{20}=1.4238$) in 600 ml. isopropanol was reacted with excess hydrogen sulfide in the presence of 5.1 g. ammonia. After the removal of isopropanol and ammonia 178 g. of crude material was obtained; $n_D^{20}=1.554$.

The NMR spectrum showed the following bands:

$\delta=4.7$ multiplet—proton neighboring the O-atom in 4,5-dihydrofuran ring $\delta=4.0$ multiplet—protons neighboring the O-atom in tetrahydrofuran ring $\delta=1.9$ singlet—methyl group attached to double bond $\delta=1.3$ doublets—methyl group attached to secondary carbon atom The odor and taste of material obtained can—in high dilution—be described as meat-like and ham-like.

EXAMPLE 4

Preparation of 2′,4′,3,5-tetramethyl-3′,4-dioxa-2,8-dithia-bicyclo{3,3,0}octan - spirocyclopentane and 2′,4′,4,6-tetramethyl - 3′,5 - dioxa-2,8-dithia bicyclo{3,3,0}octan-spirocyclopentane; (II/III, R′=R″=CH$_3$, X=O)

By the general procedure disclosed in Example 2, 125 g. of the material obtained in Example 3 is dissolved in 250 g. tetrahydrofuran or 250 g. of dimethylsulfoxide and treated with a trace of p-toluenesulfonic acid. The 103 g. crude reaction product obtained had an $n_D^{20}=1.551$, and—in high dilution—a meat-like odor and taste.

The following NMR spectrum was obtained:

$\delta=4.7-4.0$ complex multiplet—protons neighboring an O-atom in the tetrahydrofuran rings $\delta=1.83$ singlets—methyl group attached to quaternary carbon atom $\delta=1.35$ doublet—methyl groups attached to secondary carbon atom The $\delta=1.83$ peak consists of more than one singlet due to the presence of different stereo isomers with small differences in chemical shift.

EXAMPLE 5

Preparation of (2-methyl-3-mercapto-tetrahydrothienyl-3) (2′-methyl-4′,5′-dihydrothienyl-3′)sulfide and (2-methyl-3-mercapto-tetrahydrothienyl-3)(2′-methyl-2′,5′ - dihydrothienyl-3′)sulfiide; (I: R′=CH$_3$, R″=H, X=S)

By the general method disclosed in Example 1, 40 g. of 2-methyltetrahydrothiophen-3-one (P. Karrer and H. Schmid, Helv. Chim. Acta 27, 124 (1944); B.P. 68–70° C./11 mm., $n_D^{20}=1.5078$) in 150 ml. of isopropanol was saturated with hydrogen sulfide in the presence of 4 g. ammonia. After removal of solvent and a small amount of the starting ketone 38 g. of crude material was obtained; $n_D^{20}=1.637$.

The NMR spectrum showed the following bands:

$\delta=3.46$ quartet— —S—C(CH$_3$)H—C $\delta=2.10$ singlet—methyl group attached to double bond $\delta=1.37$ doublet—methyl group attached to secondary carbon atom.

The odor and taste of the material can—in high dilution—be described as meat-like.

EXAMPLE 6

Preparation of 2′,3-dimethyl - 2,3′,4,8 - tetrathia-bicyclo{3,3,0}octan-spirocyclopentane and 2′,4′-dimethyl-2′,3′,5,8 - tetrathia bicycle{3,3,0}octan - spirocyclopentane; (II/III, R′=CH$_3$, R″=H, X=S)

By the general procedure disclosed in Example 2, 30 g. of the material prepared according to Example 5 is dissolved in 60 ml. tetrahydrofuran or 60 ml. dimethylsulfoxide in the presence of a trace of p-toluenesulfonic acid. The 25 g. crude reaction product had an $n_D^{20}=1.636$, with an odor and taste that—in high dilution—was associated with meat.

I claim:

1. A compound selected from compounds of the Formula I

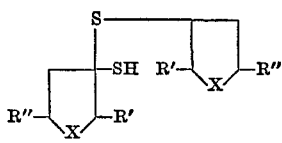

Compounds of the Formula II

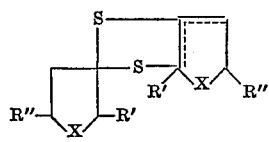

and compounds of the Formula III

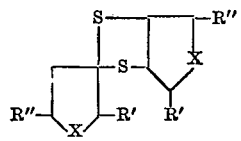

wherein X is selected from the group consisting of sulfur and oxygen, R' is methyl, R" is selected from the group consisting of hydrogen and methyl, and the double bond in formula I is in one of the two positions represented by the dotted lines.

2. A compound according to claim 1, wherein R' is methyl, R" is hydrogen, and X is oxygen.

3. A process for the preparation of a compound of claim 1, Formula I, which comprises reacting a compound of the formula

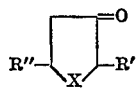

wherein R' is methyl, R" is selected from the group consisting of hydrogen and methyl, and X is selected from the group consisting of sulfur and oxygen with hydrogen sulfide in the presence of a base and solvent.

4. A process according to claim 3, wherein the reaction is carried out in the presence of ammonia as the base and of isopropyl alcohol as the solvent.

5. A process for the preparation of a compound of claim 1, Formulae II or III, which comprises reacting a compound of claim 1, Formula I with acid.

6. A process for the preparation of a compound of claim 1, Formulae II or III, which comprises reacting a compound of claim 1, Formula I by standing said compound at room temperature in the absence of an acidic reagent and of a solvent.

References Cited
UNITED STATES PATENTS
3,666,495  5/1972  Evers _____ 99—140 R

HENRY R. JILES, Primary Examiner

C. M. S. JAISLE, Assistant Examiner

U.S. Cl. X.R.
99—140 R; 260—329 HS, 347.2